US010440409B2

(12) United States Patent
Naccache et al.

(10) Patent No.: US 10,440,409 B2
(45) Date of Patent: Oct. 8, 2019

(54) METHOD AND DEVICE ALLOWING AN ACCESS CONTROL SYSTEM TO BE APPLIED TO THE PROTECTION OF STREAMED VIDEO

(71) Applicant: EVIO POLSKA sp. z o.o., Poznan (PL)

(72) Inventors: David Naccache, Paris (FR); Lukasz Jeczminski, Varsovie (PL); Mateusz Zajakala, Bydgoszcz (PL); Jas Saini, Blonay (CH)

(73) Assignee: 4T S.A., Bertrange (LU)

( * ) Notice: Subject to any disclaimer, the term of this patent is extended or adjusted under 35 U.S.C. 154(b) by 169 days.

(21) Appl. No.: 15/492,697

(22) Filed: Apr. 20, 2017

(65) Prior Publication Data

US 2017/0311007 A1    Oct. 26, 2017

(30) Foreign Application Priority Data

Apr. 20, 2016    (FR) ..................... 16 53506

(51) Int. Cl.
*H04N 21/2347* (2011.01)
*G06F 21/10* (2013.01)
(Continued)

(52) U.S. Cl.
CPC ......... *H04N 21/2347* (2013.01); *G06F 21/10* (2013.01); *H04L 9/0894* (2013.01);
(Continued)

(58) Field of Classification Search
CPC ............. H04N 21/2347; H04N 7/1675; H04N 21/2351; H04N 21/2541; H04N 21/26606; H04N 21/4405; H04N 21/4623; H04N 21/4627; H04N 21/47202; H04N 21/63345; G06F 21/10; H04L 9/0894; H04L 9/14; H04L 63/0428; H04L 65/1069; H04L 65/4076; H04L 65/4084; H04L 65/605;
(Continued)

(56) References Cited

U.S. PATENT DOCUMENTS 9,043,827 B1    5/2015 Rapoport et al.
2004/0242150 A1   12/2004 Wright et al.
(Continued)

FOREIGN PATENT DOCUMENTS

EP    2 034 729 A2    3/2009
WO    20130186274 A1   12/2013
WO    20140152060 A1    9/2014

OTHER PUBLICATIONS

Nov. 2, 2016 Preliminary Search Report issued in FR1653506.
(Continued)

*Primary Examiner* — Harunur Rashid
*Assistant Examiner* — Sakinah White Taylor
(74) *Attorney, Agent, or Firm* — Mark M. Friedman

(57) ABSTRACT

Some embodiments are directed to a method and to a device allowing an access control system to be applied to the protection of streamed video. The inventive system and associated method allow an existing access control system of Marlin type to be used innovatively based on the execution of two successive operation phases allowing DRM rights to be acquired followed by the delivery of content and the decryption thereof.

8 Claims, 2 Drawing Sheets

(51) Int. Cl.

| | | |
|---|---|---|
| *H04L 9/08* | (2006.01) | |
| *H04L 9/14* | (2006.01) | |
| *H04L 29/06* | (2006.01) | |
| *H04N 21/235* | (2011.01) | |
| *H04N 21/254* | (2011.01) | |
| *H04N 21/4627* | (2011.01) | |
| *H04N 7/167* | (2011.01) | |
| *H04N 21/266* | (2011.01) | |
| *H04N 21/4405* | (2011.01) | |
| *H04N 21/4623* | (2011.01) | |
| *H04N 21/472* | (2011.01) | |
| *H04N 21/6334* | (2011.01) | |

(52) U.S. Cl.
CPC ............ *H04L 9/14* (2013.01); *H04L 63/0428* (2013.01); *H04L 65/1069* (2013.01); *H04L 65/4076* (2013.01); *H04L 65/4084* (2013.01); *H04L 65/605* (2013.01); *H04N 7/1675* (2013.01); *H04N 21/2351* (2013.01); *H04N 21/2541* (2013.01); *H04N 21/26606* (2013.01); *H04N 21/4405* (2013.01); *H04N 21/4623* (2013.01); *H04N 21/4627* (2013.01); *H04N 21/47202* (2013.01); *H04N 21/63345* (2013.01); *H04L 63/062* (2013.01); *H04L 63/068* (2013.01); *H04L 2209/603* (2013.01); *H04L 2463/101* (2013.01)

(58) Field of Classification Search
CPC ................. H04L 63/062; H04L 63/068; H04L 2209/603; H04L 2463/101
See application file for complete search history.

(56) References Cited

U.S. PATENT DOCUMENTS

| | | |
|---|---|---|
| 2009/0028331 A1 | 1/2009 | Millar et al. |
| 2010/0067703 A1 | 3/2010 | Candelore |
| 2014/0006951 A1* | 1/2014 | Hunter .................. H04H 60/31 715/719 |
| 2014/0082658 A1* | 3/2014 | Wang ................. H04N 21/4405 725/31 |
| 2014/0233740 A1* | 8/2014 | Niamut ................. H04L 9/3013 380/279 |

OTHER PUBLICATIONS

"Digital Video Broadcasting (DVB); Head-end implementation of DVB SimulCrypt", European Broadcasting Union, XP-002728057, ETSI TS 103 197, No. V1.5.1, Oct. 2, 2008, pp. 1-291.

* cited by examiner

METHOD AND DEVICE ALLOWING AN ACCESS CONTROL SYSTEM TO BE APPLIED TO THE PROTECTION OF STREAMED VIDEO

CROSS REFERENCE TO RELATED APPLICATION

This application claims the priority benefit under 35 U.S.C. § 119 of French Application No.: 1653506, filed on Apr. 20, 2016, the contents of which is hereby incorporated in its entirety by reference.

BACKGROUND

Some embodiments relate to digital content protection and, in particular, audiovisual content protection. More specifically, some embodiments relate to a technique that can be applied, inter alia, to access control and content protection systems, such as to impede unauthorized access to content produced by digital content providers.

Conditional Access Systems

The terms "conditional access" (CA) and "conditional access systems" (CA systems or CASs) refer to a set of devices, processes and software the aim of which is to protect digital or analogue content. CASs implement the protection of content by ensuring that a set of requirements are met before authorizing access to the content. The term CAS is often associated with digital television systems (both those broadcast via satellite and those broadcast via cable) even though, historically, the first CASs were analogue (e.g. the Videocrypt system by Thomson Consumer Electronics).

The Digital Video Broadcasting (DVB) standard defines the CAS standards in the specification documents referred to as DVB-CA (Conditional Access), DVB-CSA (Common Scrambling Algorithm) and DVB-CI (Common Interface). These standards define a method allowing a digital television stream to be scrambled while allowing users having a valid decryption smart card to access this stream. The DVB specifications for conditional access are available online and are known to those skilled in the art. Hundreds of millions of pay television decoders currently implement the DVB specifications.

Content protection is achieved by combining the scrambling of the video signal and the encryption of the scrambling keys. The video data stream is scrambled using a secret cryptographic key of 48 bits referred to as a "control word" (CW). Knowledge of a CW at any given time is unlikely to seriously compromise the security of the conditional access system insofar as content providers change the CW multiple times per minute. The duration of validity of a given key (this duration being a parameter of the CAS) is referred to as the "crypto period" (CP). The CW is generated in such a way that knowledge of the CW of CP number n does not allow the CWs of CPs number n+1 and beyond to be guessed or calculated. Knowledge of the CW of CP number n does not allow the CWs of CPs number n−1 and before to be guessed or calculated either. The DVB specifications recommend the use of a physical method to achieve this.

In order for the recipient to be able to decrypt the incoming data stream, the receiving device must be kept permanently informed of successive CWs. In practice, the receiving device must actually be informed of the CWs slightly in advance in order to avoid any interruption in the display of content to the user.

Encryption is used in order to protect the CW during transmission thereof to the recipient: the CW is encrypted so as to become an entitlement control message (ECM). The CAS of the receiving device decrypts the ECM in order to extract the CW therefrom only if the recipient is authorized to do so. The ability to do this is sent to the recipient in the form of an entitlement management message (EMM). EMMs are specific to each subscriber, identified using the smart card inserted into his or her decoder, or to a group of subscribers. EMMs are usually transmitted or renewed once per month. Following a number of attacks in this area, it is apparent that such a frequency of EMM dissemination is not sufficient to prevent fraud. Thus, the company TPS has decreased the time between EMM disseminations to 12 minutes. This frequency may differ greatly between content providers: for example, BSkyB uses a duration of validity of a month and a half. When the Nagravision 2 system was compromised, the company Digital+ started renewing EMMs every three days in order to inhibit the playout of content by pirates.

The contents of ECMs and EMMs are not standardized. Thus, their formats depend on the particular CASs in use.

The CW may reach the receiving device via multiple ECMs at the same time, thereby allowing the use of multiple CASs at the same time. This technique, specified by DVB and known by the term "SimulCrypt", makes it possible to save bandwidth and encourages multiple operators to multiplex their information and to cooperate. DVB SimulCrypt is very common in Europe. Certain channels, such as CNN International Europe broadcast from Hot Bird satellites, may use up to seven different CASs in parallel.

Decryption cards are read and sometimes updated with specific viewing rights, either via a conditional access module (CAM), a PCMCIA-format card reader (also referred to as the PC card format) meeting the requirements of the DVB-CI standards, or via an ISO/IEC 7816-compatible embedded card reader, such as that of the Sky Digibox.

Given the common and frequent use of CA in DVB systems, numerous illegal tools exist that allow DVB encryption to be weakened or circumvented. There exist CAM emulators and multi-format CAMs. Multi-format CAMs can either read multiple card formats or directly decrypt a compromised CAS. The majority of multiple format CAMs and all CAMs capable of decrypting a signal are based on the reverse-engineering of the corresponding CAS. Numerous CASs have been compromised to date.

Digital Rights Management

Digital rights management (DRM) aims to control the usage of digital works.

DRM can be applied to any type of physical digital medium (discs, digital versatile discs, Blu-ray, software, etc.) or of transmission (broadcast, Internet services, etc.) by virtue of a CAS, as described above.

DRM software or technical devices may aim to:
restrict the reading of the information medium to a given geographical area (for example DVD zones);
restrict the reading of the information medium to specific equipment (for example the smartphone or tablet versions);
restrict the reading of the information medium to a manufacturer or seller (in order to lock out the competition);
restrict or prevent the private copying of the information medium (transfer to an external device);
restrict or block certain playback functions of the medium (deactivation of fast-forward in certain sections of a DVD). This is very useful for forcing exposure to advertising;

identifying and digitally watermarking any work and any item of recording or playback equipment (in order to facilitate the tracking of unauthorized copies, but first and foremost to prevent customization and hence control of a technology, for example to prevent installation of another operating system on a computer).

DRM technical measures make use of encryption of a work, in combination with CA. The editor or distributor making use of this CAS provides the key controlling access to the product only in exchange for proof of purchase or subscription allowing access thereto (subscription to a pay channel, VOD, download, etc.). Playback (and/or copy) access to the document thus protected is then authorized only for the item of equipment or for the software identification certified by the provider.

The concepts relating to technical measures for protecting content exist in law (DMCA in Europe and the United States, DADVSI in France) and are the subject of an international agreement. The law recognizes CA as a protective measure and punishes users who circumvent it or publish its secrets.

A DRM architecture is based on the encryption of works. Only a device having the decryption key is capable of reading the work. A problem posed by this principle is the inviolability of hardware used by the public to look up works, so that the decryption keys remain secret. Thus, the secrets of DVD players have been unveiled and DVDs can now be decrypted by software not having the keys. In order to keep inviolable secrets on the computer of each user, manufacturers develop DRM systems that are embedded deeply within the hardware of the computers. The aim is to make it possible for each computer to be remotely (via Internet) and reliably identified. Thus, a client-server architecture allows the use and dissemination of each copy of a work to be continually verified.

Multiple manufacturers already implement purely software-based DRM systems, which are nonetheless subject to circumvention.

The general mode of operation of such a DRM system is laid out below:

the content server S holds content C that is protected by authors' rights (for example music);

the client K is the software or the peripheral allowing C to be read (for example a multimedia player or a digital audio player);

when a user U wishes to download a file F, K delivers a unique identifier to S. S encrypts F (in order to obtain C) specifically for U;

C is subsequently transferred from S to K, usually via the Internet;

when U wishes to read the content F that he or she has downloaded, the player checks whether it already has a licence for F. If the reader does not have a licence, it connects to S. If U is authorized (for example through having made payment), the player downloads a licence L. L is a data structure containing the decryption key and the conditions of use of the content F. L is protected in terms of confidentiality and integrity;

the player verifies that the conditions of use defined by L are met. If this is the case, the reader can decrypt C using the decryption key stored in the licence in order to deliver F to U.

However, if U changes client (new software, new computer, new audio player), he or she will have to request a new licence L' according to the conditions of the contract agreed with the provider (for example, iTunes allows seven licences linked to a change in hardware without time restriction for the purchase of one track).

IP Television

IP television, television over IP, or IPTV (Internet Protocol television) is a form of television broadcast over a network using the IP (Internet Protocol).

The term IPTV covers live television, video on demand (VOD), game on demand (GOD, or cloud gaming) and catch-up W. Various communication methods are used. Live television uses a multicast IP solution (also referred to as "IP multicast"), which allows a one-time transmission of information to multiple individuals. VOD and catch-up TV use a unicast IP solution (a single receiver for these streams).

IPTV uses the same infrastructure as Internet access, but with reserved bandwidth. In France, IPTV is often provided along with a high-speed Internet subscription offer. Providers speak of "triple-play" offers (Internet, telephone, television).

IPTV may also be deployed in private communities: specifically, this allows a hotel, hospital or holiday home to be able to offer a bundle of IPTV channels as well as a range of billable and on-demand services; the body offering this network is considered to be the telecom provider.

IP technology allows the interface to be shared with other applications (Internet, VoIP). Moreover, codecs of increasingly better performance (MPEG-2, MPEG-4 and VC-1) make it possible to optimize the consumption of bandwidth. The IP network thus allows more content and functionalities to be broadcast. In a conventional or satellite TV network employing video broadcast technology, the entirety of the content is continuously provided to the user, who subsequently selects it via his or her decoder. He or she may then choose from a variety of options while the telecom, cable or satellite provider continuously feeds the broadcast channel. However, an IP network operates differently: the content remains in the network, and only those items of content selected by the user are transmitted thereto. This makes it possible to free up bandwidth and to avoid user choice being limited by the size of the broadcast channel. Only those channels that are being watched are transmitted over the IP network by virtue of multicasting, unlike VOD in which the video is transmitted using unicast and hence the bandwidth is used for each viewer.

The IP platform also allows a truly interactive and personalized viewing experience. For example, the provider may add an interactive programme guide allowing users to search by title or by actor, or else "picture-in-picture" (PiP) functionality allowing a second channel to be watched on the TV screen. In this way, viewers are able to look up player statistics while watching the match or else select the camera angle. They may also access music and photos stored on their computers directly from their television, use a mobile phone to schedule the recording of a program, or else set parental controls.

All of this is nevertheless made possible by virtue of the existence of terrestrial, satellite and cable networks in combination with sophisticated decoders. In order to set up an interaction between the receiver and the transmitter, a parasitic channel is required. It is for this reason that terrestrial, satellite and cable television networks are not interactive. However, interactivity via these networks is made possible through the combined use of TV networks and data networks such as the Internet or a mobile communication network.

The Marlin System

Marlin is a DRM platform created by an open standards community called the Marlin Developer Community (MDC). MDC develops the required technology and manages partners and services allowing the creation of interoperable digital content distribution services. The Marlin technology provides consumers with the capability to manage inter-device relationships, network services and digital content. With Marlin, content providers and device manufacturers are able to create and support content access services over open networks.

MDC was formed in 2005 by five companies: INTERTRUST, PANASONIC, PHILIPS, SAMSUNG and SONY. MDC published its first set of specifications in May 2006. The founders of MARLIN also formed the Marlin Trust Management Organization (MTMO) in order to create a neutral trust organization capable of managing and granting Marlin licences. The MTMO started operating commercially in January 2007.

Marlin was created with specific design aims. First and foremost, Marlin allows consumer devices to import content from multiple and independent services and to permit peer-to-peer interactions. Secondly, Marlin is based on a general-purpose DRM architecture. The specifications of the Marlin system define both the technical features and the architecture that are required for the interoperability of devices and services.

The majority of implementations of Marlin respect the core specifications of Marlin. This core defines (1) the basic components, (2) protocols, (3) and consumer domain model that allow interoperability between devices implementing Marlin and (4) services implementing the Marlin specifications. These specifications are based on the Octopus and NEMO reference technologies which have been adapted for inter-device peer-to-peer interactions.

Octopus:

The management of rights within Marlin is based on Octopus, which is a general-purpose DRM architecture. The Octopus core system is a graph-based relationship engine. In Marlin, Octopus node objects are used to represent system entities (such as users and devices) and links between nodes represent relationships. The system of nodes and links manages where, how, and when content can be used in the system. Octopus is available on various platforms and its media format is cryptographically agnostic.

NEMO (Networked Environment for Media Orchestration) provides a service provision framework allowing trusted connections between various components of a Marlin DRM system. Based on web services standards, NEMO defines service interfaces, service access policies as well as support and trust relationships among distributed entities that play well-defined and certified roles. The NEMO framework allows Marlin components to create protected messages and to exchange them between authenticated and authorized entities. The services supported by NEMO may be operated together with other, application-specific media services that are not necessarily required to be NEMO-compliant.

The main products that implement MARLIN are:
EXPRESSPLAY: EXPRESSPLAY is a hosted service provided by Inter-trust INTERTRUST since May 2013. EXPRESSPLAY was mainly designed to embed Marlin content protection within Internet-based content distribution services. EXPRESSPLAY offers a hosted Marlin server component for managing MARLIN keys and a software development kit (SDK) for iOS and Android clients.

The BLUEWHALE MARLIN Broadband Server: is a configurable implementation of the Marlin server that provides the necessary support for the delivery of digital content to Marlin clients. In order to prepare the information required by the clients, a BLUEWHALE server is integrated within the back-end business logic of a service provider using an XML interface. The server translates the business logic into Marlin rights objects, creating and managing user registrations and licences.

BENTO4 Packager: The BENTO4 Packager is a software tool for packaging and parsing content. BENTO4 operates with MARLIN clients. This tool packages, encrypts and protects content files on the server side. On the client side, this tool allows content to be decrypted and parsed.

SUSHI MARLIN Client SDK: The SUSHI MARLIN Client SDK is used to create a client with DRM functionality. This software development kit (SDK) provides the primary MARLIN components required to determine licence conditions and to control access to protected content. The SUSHI MARLIN Client SDK can be adapted for content playback hardware devices. The SUSHI MARLIN Client SDK can also be used by service access applications in order to enrich such applications with DRM functionality. The SUSHI MARLIN Client SDK is no longer provided by INTERTRUST as of May 2013.

The Marlin Partner Program: In October 2008, the MDC announced the creation of the Marlin Partner Program (MPP). The MPP initially included over 25 companies. In January 2014, this programme included 42 partner companies. Partner members identify, develop and provide a variety of technical components and integration services, the aim of which is to create a marketplace for Marlin solutions. Network operators, service providers, device manufacturers and other companies deploying Marlin-based products and services may thus collaborate with MPP member companies.

Marlin Trust Management Services: The MARLIN technology is based on standards but the security of a Marlin system is managed by an independent entity called the Marlin Trust Management Organization (MTMO). The MTMO maintains the integrity and security of the system using its key management services.

The Current Deployment of MARLIN: MARLIN has been commercially deployed throughout the world in a variety of devices and services. MARLIN is included in the Japanese national IPTV standard and has been deployed by ACTVILA, a web-based television portal launched in 2007. The ACTVILA portal service, created by HITACHI, PANASONIC, SHARP, SONY, and TOSHIBA, included a deployment of Internet TV services. SONY uses MARLIN in PLAYSTATION Network, thus providing users with a video download service allowing content to be purchased or rented on the PS3, PS4 and PSP systems. MARLIN is also used in PHILIPS NetTV BLU-RAY players.

The following standards organizations have incorporated MARLIN into their specifications:
Ultraviolet, the cloud-based digital rights distribution and authentication system by the Digital Entertainment Content Ecosystem consortium (DECE LLC); the Open IPTV Forum.
Additionally, the following national initiatives have selected MARLIN: the Italian Internet services platform developed by the TIVU Sat consortium; YouView of London, UK, the British connected open Internet platform;

the TNT 2.0 specifications by the French HD Forum;
lastly, Chinese consumer media services such as iQIYI of Beijing, China (founded by BAIDU, Inc. of Beijing, China) and PPTV are also MARLIN members.

Over-the-Top Services

An over-the-top (OTT) service is a service for providing audio, video and other media over the Internet without the involvement of a traditional network operator (such as a cable, telephone or satellite company) in the control or distribution of content. The Internet access provider distributing the content may be aware of the content of IP packets in its network, but is not responsible for, nor capable of controlling, the display of content, the observance of authors' rights and/or the redistribution of content.

OTT is very different to the purchase or rental of audio or video content from a traditional network provider, such as pay television, video on demand, IP television or the AT&T U-verse service. OTT instead relates to content originating from third parties, such as HULU, NETFLIX, CRUNCHYROLL or TOU.TV, and delivered to the user device by an Internet access provider that serves merely as a transporter of IP packets.

Consumers can access an OTT service via various devices that are connected to the Internet, such as desktop computers, laptops, games consoles (such as the PLAYSTATION 4, the WII U and the XBOX ONE), set-top boxes (STBs) (such as the ROKU), smartphones (including ANDROID phones, IPHONE and WINDOWS phones), smart TVs (such as GOGGLE TV) and tablets.

SUMMARY

Related art television broadcast environments depend on CASs to provide services for managing access rights and scrambling (encrypting) audiovisual content. These systems typically use a smart card inserted into the STB. The smart card is used to manage content keys and periodically provides these content keys to the descrambling system. Smart cards can be coupled with a specific STB such that it can be used only with that decoder. This conventional system, the level of security of which is known and has been studied, has now been in use for three decades. Despite this, the drawbacks of this conventional system are known to television network operators and to those skilled in the art. In using a hardware-based solution, television network operators must bear the cost of purchasing smart cards. Furthermore, STBs must also be equipped with smart card readers, which increases their manufacturing and overall cost. Smart card-based systems cannot be used with OTT devices such as PCs, tablets or phones. Additionally, the DRM functionalities used in existing systems, such as for example Internet video broadcast systems, cannot be embedded in their current form within systems for transmitting streamed digital content over an Internet data communication network structured according to a multicast routing mode. Specifically, data communication networks structured according to a multicast routing mode impose very particular network bandwidth and load constraints which differ from those of the systems mentioned above, these being structured in unicast mode and for which the bandwidth is used for each viewer. The simple duplication, in a system for transmitting streamed digital content over an Internet data communication network structured according to a multicast routing mode, of DRM functionalities currently used in Internet video broadcast systems, or else in discs or digital content players, would make this system much more complex and almost impossible to maintain. Specifically, the same content would have to be protected multiple times in order to be viewed on different devices. Lastly, the majority of CASs do not support advanced content management functions such as those offered by DRM systems (in which a content licence can be purchased in multiple different ways and include various access conditions that must be met).

Some embodiments relate to the implementation of an architecture for protecting digital content, in particular audiovisual content, in dedicated processors, microprocessors, computers, decoders and computing devices. Such an architecture simultaneously provides (1) a higher level of security than the prior art, (2) an architecture that is substantially better optimized than the prior art and (3) extends existing systems to the protection of streamed video.

Some embodiments relate to pay television networks and to online content broadcasters, for which it is desirable to allow access to the streamed digital content only to those users who have actually acquired the rights to access such content.

Some embodiments have numerous applications, such as for example the protection of entertainment content, teleconferences, video streams from mobile phones or any other application in which a streamed item of digital content should be accessible only to a restricted set of recipients or subscribers.

More generally, some embodiments can be applied to any case in which such streaming systems are used or deployed.

Some embodiments relate to a system for managing digital rights and for streaming digital content over an Internet data communication network structured according to a multicast routing mode. Some embodiments also relate to a method for acquiring digital rights and a method for transmitting streamed digital content implemented by such a system, a computer program product for implementing such methods and a recording medium on which a computer program for implementing such methods is recorded.

Other aspects of some embodiments focus on describing the existing problems in the field of the controlled broadcast of encrypted audiovisual content faced by the inventors. The invention is of course not limited to this particular field of application, but is of interest to any technique employed to protect audiovisual content or to any technique facing similar problems.

Some of the embodiments avoid at least some of the drawbacks of the related art.

Some embodiments allow streamed digital content, and not only on-demand digital content, to be protected.

Some embodiments also make it possible to decrease the cost and complexity of hybrid systems allowing both streamed and on-demand digital content to be protected.

A first aspect of the invention is directed to a system for managing digital rights and for streaming digital content over an Internet data communication network is proposed, the Internet network being structured according to a multicast routing mode. The system can include:
  a digital rights management device including:
    at least one module for encrypting an item of digital content, capable of being linked to a source of streamed digital content via said Internet data communication network and capable of receiving said streamed digital content from said source of digital content;
    a module for storing cryptographic encryption keys and content identifiers, linked to the encryption module;
    a module for interfacing with a customer relationship management system;

at least one module for creating and managing action tokens, linked to the interfacing module; and at least one module for managing digital rights and access to said digital content, linked to the module for storing cryptographic encryption keys and content identifiers and to the module for creating and managing action tokens; said module for managing digital rights and access to said digital content comprising a database for storing objects and transactions linked to said digital rights; and a client device for accessing said streamed digital content, linked to the digital rights management device via said Internet data communication network and comprising:

a module for accessing, parsing and playout of said streamed digital content;

a user interface module, linked to the module for creating and managing action tokens; and a client module for managing digital rights, linked to the module for accessing, parsing and playout of said streamed digital content, to the user interface module and to the module for managing digital rights and access to said digital content;

wherein each module is formed from a software component, from a hardware component or from an assembly of software and hardware components.

Advantageously, the module for encrypting an item of digital content includes a first sub-module for scrambling digital content and a second sub-module for generating entitlement control messages, linked to the first sub-module, the first sub-module for scrambling digital content being capable of encrypting said digital content via a secret cryptographic encryption key, the second sub-module for generating entitlement control messages being capable of encrypting each of said secret cryptographic encryption keys and thus of obtaining, for each encrypted secret cryptographic encryption key, an entitlement control message.

Advantageously, the first sub-module for scrambling digital content is a multiplexer.

Advantageously, the digital rights management device comprises a first, front-end module for creating and managing action tokens and a second, back-end module for creating and managing action tokens, linked to the first, front-end module.

Advantageously, the digital rights management device comprises a first, front-end module for managing digital rights and access to the digital content and a second, back-end module for managing digital rights and access to the digital content, linked to the first, front-end module.

Advantageously, the Internet data communication network is a network compliant with the IP television standard and the streamed digital content is a streamed television audiovisual stream.

Advantageously, the digital rights management device and the client device form a client-server architecture, at least one of the modules of the digital rights management device being a server.

A second aspect is directed to a method for acquiring digital rights implemented by a system such as described above. The method can include:

the transmission, by the user interface module, of a digital rights update request, said update request comprising an identifier of the client device and a digital rights management (DRM) identifier;

the transmission, by the module for creating and managing action tokens, subsequent to the reception of the digital rights update request, of a request to retrieve the digital rights of the user, said request being transmitted on the basis of the identifier of the client device;

the transmission, by the interfacing module, of said request to the customer relationship management system;

the reception, by the module for creating and managing action tokens, via the interfacing module, of the digital rights of the user transmitted by the customer relationship management system;

the transmission, by the module for creating and managing action tokens, of said received digital rights to the module for managing digital rights and access to said digital content;

the translation, by the module for managing digital rights and access to said digital content, of said digital rights into objects linked to said digital rights;

the assignment, by the module for managing digital rights and access to said digital content, of a unique transaction identifier specific to each object generated;

the transmission, by the module for creating and managing action tokens, for each object generated, of an action token containing a list of actions that must be performed in order to retrieve this object, along with the unique transaction identifier relating to this object, to the user interface module;

the transmission, by the user interface module, for each object generated, of an instruction comprising said action token and said unique transaction identifier relating to this object, to the client module for managing digital rights;

the transmission, by the client module for managing digital rights, for each object generated, of an instruction comprising said action token and said unique transaction identifier relating to this object, to the module for managing digital rights and access to said digital content;

the retrieval, by the module for managing digital rights and access to said digital content, for each object relating to a received action token, of said object, on the basis of the unique transaction identifier and of the list of actions relating to this object;

the transmission, by the module for managing digital rights and access to said digital content, of a request to translate the digital rights management (DRM) identifier into a cryptographic encryption key, to the module for storing cryptographic encryption keys and content identifiers;

subsequent to the translation, by the module, of the digital rights management (DRM) identifier into a cryptographic encryption key, the transmission, by the module for managing digital rights and access to said digital content, for each object relating to a received action token, of said object to the client module for managing digital rights, the or each object transmitted comprising said cryptographic encryption key.

A third aspect is directed to a method for transmitting streamed digital content over an Internet data communication network, said Internet network being structured according to a multicast routing mode, said method being implemented by a system such as described above. The method can include a sub-method for acquiring digital rights such as described above. The method can additionally include:

the transmission, by the source of digital content, of an item of streamed digital content, to the module for encrypting an item of digital content, via the Internet data communication network;

the encryption, by the module for encrypting an item of digital content, of said item of digital content, via a secret cryptographic encryption key;

the transmission, by the module for encrypting an item of digital content, of access criteria required for a given channel, to the module for storing cryptographic encryption keys and content identifiers, said channel containing all or part of said item of digital content;

the translation, by the module for storing cryptographic encryption keys and content identifiers, of said required access criteria into a specific content identifier and into a specific content key;

the transmission, by the module for storing cryptographic encryption keys and content identifiers, of said specific content identifier and said specific content key, to the module for encrypting an item of digital content;

the insertion, by the module for encrypting an item of digital content, of said specific content identifier and said specific content key into the encrypted item of digital content, a multiplexed data stream being obtained upon completion of this insertion step, the multiplexed data stream containing said encrypted item of digital content, said specific content identifier and said specific content key;

the transmission, by the module for encrypting an item of digital content, of said multiplexed data stream to the access, parsing and playout module of the client device, via said Internet data communication network;

the retrieval, by the access, parsing and playout module, of the specific content identifier contained in the multiplexed data stream, and the transmission of said digital content identifier to the client module for managing digital rights;

the verification, by the client module for managing digital rights, of whether an object corresponding to said specific content identifier exists and, if required, the delivery of a right to access, parse and play out the digital content to the access, parsing and playout module.

A fourth aspect relates to a computer program product that can be downloaded from a communication network and/or recorded on a medium that can be read by computer and/or run by a processor, comprising program instructions, said program instructions being suitable for implementing the steps of the method for acquiring digital rights such as described above and/or the steps of the method for transmitting digital content such as described above when the program product is run on a computer.

This computer program product can use any programming language, and be in the form of source code, object code or intermediate code between source code and object code, such as in a partially compiled form, or in the form of a circuit synthesized using a hardware description language (such as VHDL or Verilog) or in any other desired form.

A fifth aspect relates to a recording medium on which a computer program, comprising program code instructions for implementing the steps of the method for acquiring digital rights such as described above and/or the steps of the method for transmitting digital content such as described above, is recorded.

The recording medium can be any entity or device capable of storing the program. For example, the medium can include a storage means, such as a RAM, a flash memory, a USB stick, a ROM, for example a CD-ROM or a microelectronic circuit ROM, or else a magnetic recording means, for example a floppy disk or a hard drive.

Furthermore, the recording medium can be a transmissible medium such as an optical or electrical signal, which can be routed by an optical or electrical cable, by radio or by other means. The program according to the proposed technique can in particular be downloaded over an Internet network.

Alternatively, the recording medium can be an integrated circuit into which the program is incorporated, the circuit being suitable for running or for being used in the running of the method in question.

According to one embodiment, the proposed technique is implemented by means of software and/or hardware components. With this in mind, the term "module" can in this document correspond just as well to a software component as to a hardware component or to a set of hardware and software components.

A software component corresponds to one or more computer programs, one or more procedures or sub-programs of a program or, more generally, to any element of a program or software element capable of implementing a function or a set of functions, according to that which is described below for the module in question. Such a software component is run by a data processor of a physical entity (terminal, server, gateway, router, etc.) and is liable to access the hardware resources of this physical entity (memories, recording media, communication buses, input/output circuit boards, user interfaces, etc.).

Likewise, a hardware component corresponds to any element of a hardware assembly capable of implementing a function or a set of functions, according to that which is described below for the module in question. It can be a programmable hardware component or a hardware component with an integrated processor for running software, for example a processor, a dedicated cryptographic coprocessor, a CPU, a supercomputer, an integrated circuit, a smart card, a memory card, a circuit board for running firmware, etc.

Naturally, each component of the system described above implements its own software modules. The various embodiments mentioned above can be combined with one another in order to implement the proposed technique.

Other features and advantages will become more clearly apparent upon reading the following description and upon examining the accompanying figures.

BRIEF DESCRIPTION OF THE DRAWINGS

Other features and advantages of the proposed technique will become more clearly apparent upon reading the following description of one preferred embodiment, provided by way of simple illustrative and non-limiting example, and from the appended drawings, in which.

DETAILED DESCRIPTION

Figure 1:
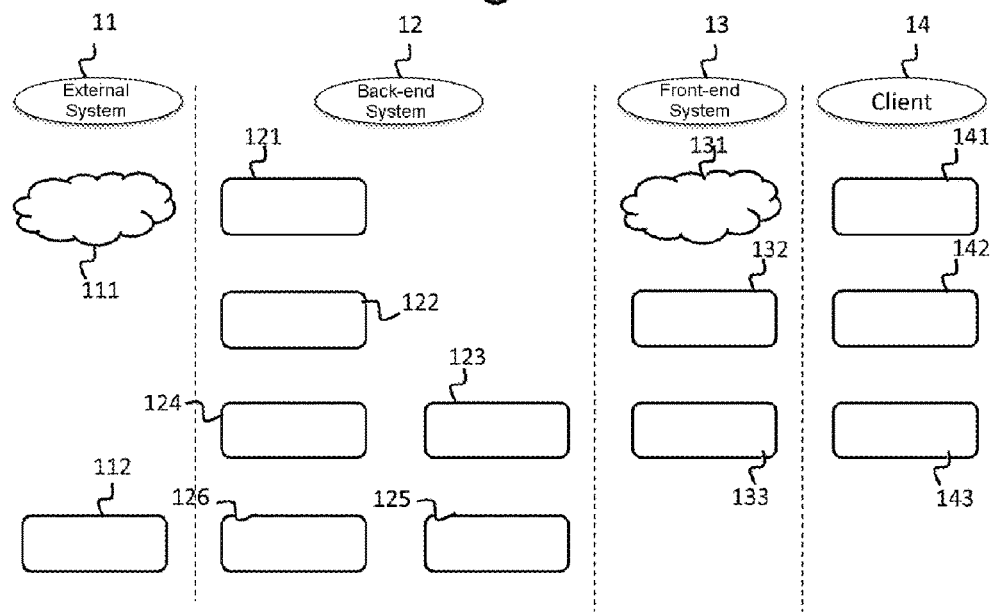
FIG. 1 illustrates the inventive system.
Figure 2:
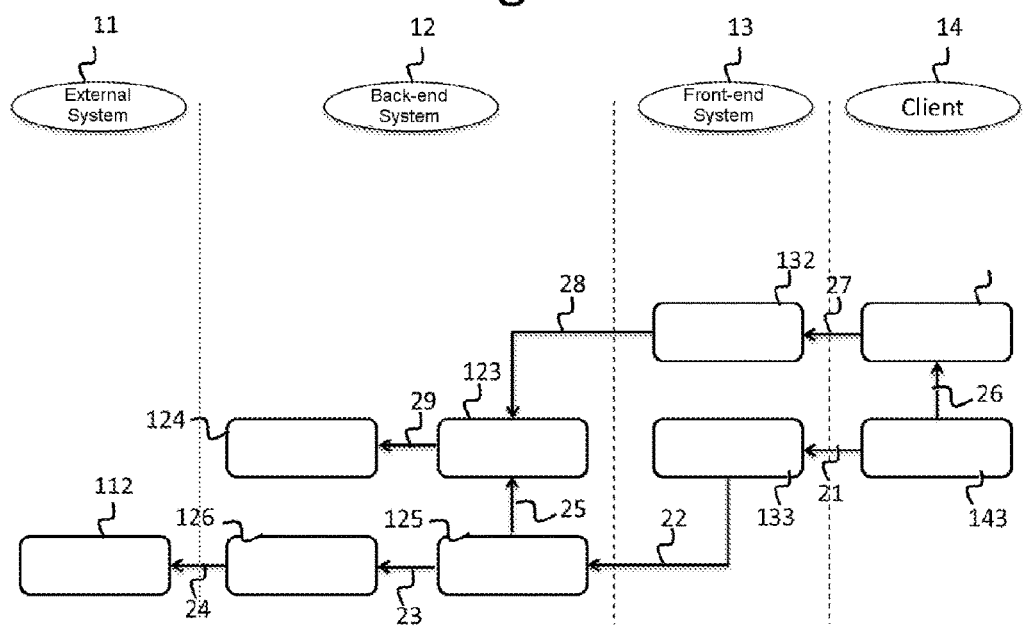
FIG. 2 illustrates the operation of the inventive system in the phase of acquiring DRM rights.
Figure 3:
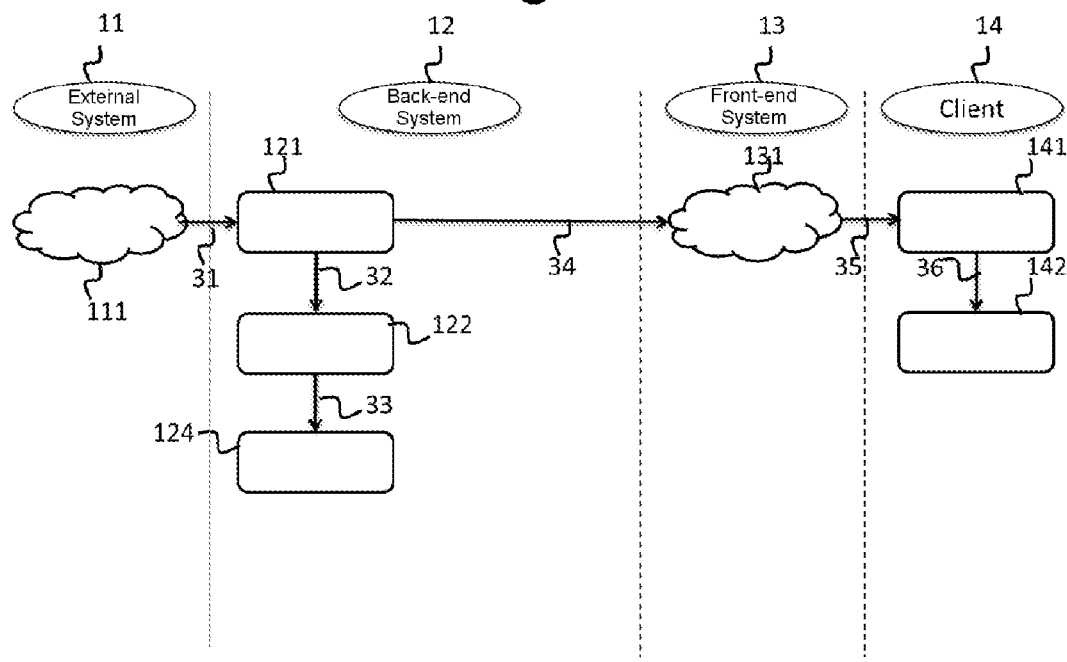
FIG. 3 illustrates the operation of the inventive system in the phase of delivering and decrypting the streamed content.

Some embodiments can include the modules discussed below.

The modules come under three categories: a "Back-End System" category (12), a "Front-End System" category (13) and a "Client" category (14); these interface with a fourth category, namely an "External System" category (11).

The "External System" category includes the following elements:

The CDN (Content Delivery Network) Source (111): The CDN source delivers the audiovisual content to the inventive system. The audiovisual content is acquired in the form of a clear (intelligible) signal from various types of content providers (for example satellite links, content aggregators, direct broadcaster links, etc.). The content is delivered to the head end in the form of an MPEG stream (MPEG single program transport stream multicast) with various bit rates and various video encoding formats (MPEG/AVC). This information passes through a plurality of Internet traffic content exchange points.

The CRM System (112): The customer relationship management system manager subscribers, their subscriptions, their bundles and commercial offers, the devices used by subscribers for accessing content and the entitlements of subscribers. The CRM System (112) provides the information required for the billing process. The CRM System (112) is used by the operational and commercial services of the operator in order to assign content access rights to clients and to manage their technical data and their billing data. The CRM System (112) is also referred to by the acronym "SMS" (subscriber management system). The CRM System (112) may be hosted at the premises of an external service provider or, otherwise, hosted by the entity using the inventive system.

The "Back-End System" category includes the following elements:

The Scrambler (121): A scrambler is a multiplexer having the capability to scramble an incoming MPEG transport stream. A typical scrambler uses TS packet scrambling with CW rotation and AES-128 encryption of the audio, video signal and subtitle content. Another exemplary embodiment is the use of DVB-CSA. In order to allow fast scrolling (forwards or backwards) through content, certain content portions may be left unencrypted (PUSI packets or, for example, 5% of the packets).

The ECM Generator (122): this generates ECMs (entitlement control messages) in order for the multiplexer to insert these ECMs into the scrambled transport stream. The interface between the scrambler (121) and the ECM generator (122) is defined by the head-end SimulCrypt standard (ETSI TS 103 197). The ECMs contain the DRM content identifier corresponding to a given bundle. The ECM generator (122) uses a Key Server (124) in order to obtain the content key corresponding to the DRM content identifier received from the scrambler (121).

The DRM Back-End System (123): this is a database storing DRM objects and transactions that must be retrieved by DRM clients. Each DRM object is for example a licence for accessing an item of digital content, a subscription node or else a link between a DRM user and a digital content identifier. Thus, the DRM Back-End System (123) groups together both the technical information relating to the DRM objects (DRM users, subscription nodes, content identifiers) and the associated business logic information (bundles, devices). The DRM Back-End System (123) provides the DRM Front-End System (132) with all of the data required to generate DRM elements such as licences, nodes and links.

The Key Server (124): this manages the content identities and content keys of all of the DRM bundles. The Key Server (124) provides secure database services to the other components of the system when these other components of the system need to access content keys corresponding to specific content identifiers.

The Token Back-End System (125) is the core of the business logic of the back-end system. The Token Back-End System (125) generates action tokens (lists of operations) for the DRM Clients (142), indicating to the DRM Clients (142) on which data the DRM Clients (142) should interrogate the DRM Front-End System (132). The Token Back-End System (125) applies the CRM data to the subscriber packet data in order to generate the transactions for retrieving DRM objects corresponding to the subscriptions in the DRM Back-End System (123). Based on the CRM data, the Token Back-End System (125) also manages the current status of the content-playout device of the subscriber. The Token Back-End System (125) also manages the bundle data in the database of the DRM Back-End System (123).

The CRM Module (126) is the portion of the inventive system that is responsible for communicating with the CRM System (112). The CRM Module (126) is a content provider abstraction layer allowing the integration of different CRM systems. It is enough that a minimum set of required operations is supported for it to be possible to use any CRM system to manage the subscriber bundle data.

The "Front-End System" category includes the following elements:

The Content Delivery Network (CDN) (131) for IPTV channels: The channels are delivered to operators in a scrambled multicast UDP MPEG SPTS format. This content delivery takes place via multiple Internet exchange points. The operators receive all of the IPTV traffic at their premises through the use of a protocol-independent multicast (PIM) router or dynamically subscribe to the required content via the IGMP (Internet Group Management Protocol) using a head-end PIM router.

The DRM Front-End System (132) is a DRM server provided by Intertrust (the DRM Front-End System (132) is also called the Bluewhale Server). The DRM Front-End System (132) is responsible for secure communication with the DRM Clients (142). The DRM Front-End System (132) uses the DRM Back-End System (123) to retrieve the business data required to generate the DRM objects required by the DRM Clients (142).

The Token Front-End System (133) is an HTTP proxy server that can be accessed via the Internet. The Token Front-End System (133) provides secure access to the services provided by the Token Back-End System (125) for User Interface (UI) Applications (143).

The "Client System" category includes the following elements:

The IPTV Client (141) is part of the application stack of the playout device of the subscriber. The IPTV Client (141) is responsible for access to IPTV content, and for parsing the content (media parsing). The IPTV Client (141) is also responsible for the playout of the content. The IPTV Client (141) handles the incoming IPTV streams and the encoding thereof. The IPTV Client (141) uses the DRM Client (142) to obtain the keys required to descramble the content.

The DRM Client (142) is a software library provided by Intertrust (known to those skilled in the art as the Wasabi/ExpressPlay SDK). The DRM Client (142) is embedded within the device used by the subscriber to access content. The DRM Client (142) communicates confidentially with the DRM Front-End System (132) in order to obtain the DRM licences and objects and provides an application programming interface (API) to the media playout subsystem allowing the content rights to be checked in relation to available licences. The DRM objects are retrieved from "action tokens" generated by the Token Back-End System (125) and are delivered to the DRM Client (142) by the UI Application (143).

The User Interface (UI) Application (143) is a high-level user interface that is present in the device used by the subscriber for accessing content (for example his or her phone or tablet). Periodically, or in response to the actions of the subscriber, the User Interface (UI) Application (143) contacts the Token Front-End System (133) in order to retrieve an "action token" for DRM rights. The action token is subsequently passed on to the DRM Client (142) library which performs the rights retrieval operation. The User Interface (UI) Application (143) provides the user with an interface allowing content to be viewed (for example browsing through IPTV channels) and allowing the local management of DRM authorizations in the DRM Client (142) library.

DESCRIPTION OF ONE PARTICULAR EMBODIMENT

In this embodiment, the system described above operates in two phases:

DRM Rights Acquisition Phase
1. The UI application (143) triggers a DRM rights update (21) by sending the device ID and the DRM ID to the token portal (133) of the inventive system.
2. The request (22) is transmitted by the token portal (133) to the token back-end (125).
3. Based on the device ID, the token back-end (125) interrogates (23) the CRM module (126) in order to retrieve the rights of the user.
4. The request (24) is transmitted by the CRM module (126) to the external subscriber management system (112).
5. The rights information retrieved (25) by the token back-end (125) is sent to the DRM server (123). Said rights information (25) is translated into DRM objects by the DRM back-end (123). The DRM back-end assigns a unique identifier (ID) to each DRM object retrieval transaction for a DRM client.
6. The UI application (143) instructs (26) the DRM client (142) to retrieve the DRM objects by creating an action token (27) containing the actions that must be carried out and passing it, along with their respective IDs, to the DRM front-end (132).
7. The DRM client (142) contacts the DRM server (123) via the DRM front-end (132) for each of the specified actions by sending a transaction ID (28) in the action token (27).
8. The DRM front-end (132) retrieves, from the DRM back-end (123), the DRM object corresponding to the DRM client (142) based on the transaction ID (28).
9. In order to construct a licence for the DRM content, the DRM back-end (123) contacts the key server (124) in order to translate the content ID (29) into a key, which forms part of the licence.

Content Delivery and Decryption Phase
1. The unencrypted content (31) is delivered by the CDN source (111) to the scrambler (121) via a multicast single-program transport stream (referred to as MPEG-TS over UDP).
2. The scrambler (121) contacts (32) the ECM generator (122) in order to construct an ECM datum containing the control word (33) and the access criteria required for a given channel.
3. The ECM generator (122) uses a key server (124) in order to translate the access criterion into a specific content ID and into a specific content key.
4. The scrambler (121) inserts the ECM (33) thus constructed into the stream of encrypted information, thus obtaining a multiplexed datum (34) sent to the CDN (131).
5. The stream of encrypted information (35) is delivered to the IPTV client (141) via the content delivery network (CDN) (131).
6. The client device (14) retrieves the ID of the content from the ECM data and consults (36) the DRM client (142) in order to check whether a licence exists for this content ID. If such is the case, the rights are granted.

OTHER FEATURES AND ADVANTAGES

Figure 4:
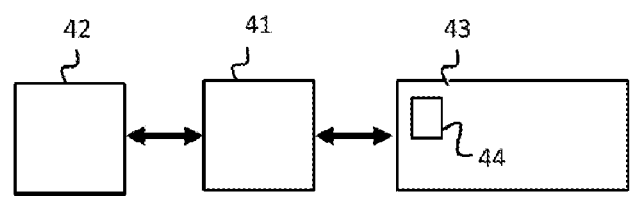
FIG. 4 illustrates a software and hardware architecture implementing the invention.

A practical application of the inventive system is typically implemented on a hardware device, the hardware architecture of which is illustrated by FIG. 4. A processor 41, for example a microprocessor, is connected to a data input and output interface means 42 and to a memory 43 in which the processor reads the instructions encoding a program 44 implementing the inventive process. The memory 43 is also used to read and write data, encrypted messages and keys.

A significant advantage of the inventive system with respect to the prior art is the following: Through the implementation of a purely software-based DRM solution for IPTV streams, the invention eliminates the drawbacks of the prior art. First and foremost, the inventive system makes use of DRM concepts such as the decoupling of content protection from the control of access rights. Thus, it becomes possible for network operators to avail themselves of a unified content protection solution that can be applied to their broadcast mode as well as to multiscreen content delivery systems. The use of a purely software-based solution allows the deployment of STBs without card readers, which are less expensive. The use of a purely software-based solution also makes it possible to avoid dependence on a specific CAS provider. The invention also has an additional advantage: the cost of a smart card (currently borne by the subscriber) is also avoided. A further advantage of the invention is the fact that the inventive system is based on a novel combination of traditional concepts and on a novel combination of traditional building blocks—such as ECMs and SimulCrypt DVB scrambling, which is compatible with any standard hardware scrambler. Thus, the deployment of an IPTV network by an operator is faster than the deployment of a streamed DRM solution. Advantageously, the invention allows operators wishing to deploy a multiscreen solution to avail themselves of a unified DRM system, using shared software and hardware components, allowing the management of rights on a wide range of devices belonging to consumers. Those operators already operating IPTV networks may thus easily deploy a DRM solution based on familiar concepts using the head-end scramblers and content delivery means that they already have in operation.

Some embodiments therefore efficiently and definitively address or overcome all of the drawbacks of the related art.

The invention claimed is:

1. A system being structured according to a multicast routing mode, the system comprising:
   a digital rights management (DRM) device, including:
      at least one encryption module to encrypt an item of digital content, the at least one encryption module operative to link to a source of streamed digital content via the Internet data communication network, and operative to receive the streamed digital content from the source of digital content, a key storing module to store cryptographic encryption keys and content identifiers, a customer relationship management (CRM) module to interface with a CRM system, at least one token module to create and manage action tokens, linked to the CRM module, and at least one DRM module to manage digital rights and access to the digital content, linked to the key storing module and to the at least one token module, the at least one DRM module including a database to store objects and transactions linked to the digital rights; and a client device to access the streamed digital content, linked to the DRM device via the Internet data communication network and including:

a client module to access, parse and playout of the streamed digital content, a user interface, linked to the at least one token module, and a DRM client module to manage digital rights, linked to the user interface and to the at least one DRM module, wherein the user interface is configured to transmit a digital rights update request to the at least one token module, the update request including an identifier of the client device and a DRM identifier, and wherein the at least one token module is configured to receive digital rights update request and transmit, subsequent to receiving the digital rights update request, a request to retrieve the digital rights of a user of the client device, the request to retrieve the digital rights being transmitted on the basis of the identifier of the client device, and wherein the CRM module is configured to transmit the request to retrieve the digital rights to the CRM system, and wherein the at least one token module is further configured to receive, via the CRM module, the digital rights of the user transmitted by the CRM system, and transmit the received digital rights to the at least one DRM module, and wherein the at least one DRM module is configured to generate DRM objects by translating the received digital rights into objects linked to the received digital rights, and assign a unique transaction identifier specific to each generated DRM object, and wherein the at least one token module is further configured to transmit, for each generated DRM object, an action token containing a list of actions that must be performed in order to retrieve the DRM object, along with the unique transaction identifier relating to the DRM object, to the user interface, and wherein the user interface is further configured to transmit, for each generated DRM object, an instruction including the action token and the unique transaction identifier relating to the DRM object, to the DRM client module, and wherein the DRM client module is configured to transmit, for each generated DRM object, an instruction including the action token and the unique transaction identifier relating to the DRM object, to the at least one DRM module, and wherein the at least one DRM module is further configured to retrieve, for each DRM object relating to a received action token, the DRM object, on the basis of the unique transaction identifier and of the list of actions relating to the DRM object, and transmit a translation request to the key storing module, the translation request including a request to translate the DRM identifier into a cryptographic encryption key, and wherein the key storing module is configured to translate the DRM identifier into a cryptographic encryption key, and wherein the at least one DRM module is further configured to, subsequent to the translation by the key storing module, transmit, for each DRM object relating to a received action token, the DRM object to the DRM client module, each transmitted DRM object including the cryptographic encryption key.

2. The system according to claim 1, wherein the at least one encryption module comprises a scrambling module to scramble digital content, and an entitlement control messages (ECM) generator to generate entitlement control messages, linked to the scrambling module, the scrambling module capable of encrypting the digital content via a secret cryptographic encryption key, the ECM generator capable of encrypting each of the secret cryptographic encryption keys and thus of obtaining, for each encrypted secret cryptographic encryption key, an entitlement control message.

3. The system according to claim 2, wherein the scrambling module is a multiplexer.

4. The system according to claim 1, wherein the Internet data communication network is a network compliant with the IP television standard, and in that the streamed digital content is a streamed television audiovisual stream.

5. The system according to claim 1, wherein the DRM device and the client device form a client-server architecture, at least one of the modules of the DRM device being a server.

6. The system of claim 1, wherein the at least one encryption module is configured to encrypt an item of digital content received from the source of digital content and transmit access criteria required for a given channel, to the key storing module, the channel containing all or part of the item of digital content, and wherein the key storing module is further configured to translate the required access criteria into a specific content identifier and into a specific content key and transmit the specific content identifier and the specific content key to the at least one encryption module, and wherein the at least one encryption module is further configured to insert the specific content identifier and the specific content key into the encrypted item of digital content and transmit a multiplexed data stream to the client module, wherein the multiplexed data stream contains the encrypted item of digital content, the specific content identifier and the specific content key, and wherein the client module is configured to retrieve the specific content identifier contained in the multiplexed data stream and transmit the digital content identifier to the DRM client module, and wherein the DRM client module is further configured to verify whether an object corresponding to the specific content identifier exists and, if required, deliver a right to access, parse and play out the digital content to the client module.

7. A method for managing digital rights, comprising:
transmitting, by the a user interface, of a client device, a digital rights update request to a token module, of a digital rights management (DRM) device, that creates and manages action tokens, the update request including an identifier of the client device, and a DRM identifier;

receiving, by the token module, the digital rights update request, and transmitting, subsequent to receiving the digital rights update request, a request to retrieve the digital rights of the a user of the client device, the request to retrieve the digital rights being transmitted on the basis of the identifier of the client device;

transmitting, by a customer relationship management (CRM) module, of the DRM device, the request to retrieve the digital rights to a CRM system;

receiving, by the token module, via the CRM module, the digital rights of the user transmitted by the CRM system;

transmitting, by the token module, the received digital rights to the-a DRM module, of the DRM device, that manages digital rights and access to the-digital content;

generating DRM objects, by the DRM module, by translating the received digital rights into objects linked to the received digital rights;

assigning, by the DRM module, a unique transaction identifier specific to each object generated DRM object;

transmitting, by the token module, for each object generated DRM object, an action token containing a list of actions that must be performed in order to retrieve the DRM object, along with the unique transaction identifier relating to the DRM object;

transmitting, by the user interface, for each generated DRM object, an instruction including the action token and the unique transaction identifier relating to the DRM object, to the-a DRM client module, of the client device, that manages digital rights;

transmitting, by the DRM client module, for each generated DRM object, an instruction including the action token and the unique transaction identifier relating to this the DRM object, to the DRM module;

retrieving, by the DRM module, for each DRM object relating to a received action token, the DRM object, on the basis of the unique transaction identifier and of the list of actions relating to the DRM object;

transmitting, by the DRM module, a translation request to a key storing module, of the DRM device, that stores cryptographic encryption keys and content identifiers, the translation request including a request to translate the DRM identifier into a cryptographic encryption key;

translating, by the key storing module, the DRM identifier into a cryptographic encryption key; and subsequent to the translation, by the key storing module, of the DRM identifier into the cryptographic encryption key, transmitting, by the DRM module, for each DRM object relating to a received action token, the DRM object to the DRM client module each transmitted DRM object including the cryptographic encryption key.

8. The method of claim 7, further comprising:

transmitting, by a source of digital content, an item of streamed digital content, to an encryption module of the DRM device, via an Internet data communication network structured according to a multicast routing mode;

encrypting, by the encryption module, the item of digital content, via a secret cryptographic encryption key;

transmitting, by the encryption module, access criteria required for a given channel, to the key storing module, the channel containing all or part of the item of digital content;

translating, by the key storing module, the required access criteria into a specific content identifier and into a specific content key;

transmitting, by the key storing module, the specific content identifier and the specific content key, to the encryption module;

inserting, by the encryption module, the specific content identifier and the specific content key into the encrypted item of digital content, a multiplexed data stream being obtained upon completion of this insertion step, the multiplexed data stream containing the encrypted item of digital content, the specific content identifier and the specific content key;

transmitting, by the encryption module, the multiplexed data stream to a client module of the client device, via the Internet data communication network, the client module configured to access, parse and playout digital content;

retrieving, by the client module, the specific content identifier contained in the multiplexed data stream, and transmitting of the digital content identifier to the DRM client module; and verifying, by the DRM client module, whether an object corresponding to the specific content identifier exists and, if required, delivering of a right to access, parse and play out the digital content to the client module.

* * * * *